(12) United States Patent
Beckett

(10) Patent No.: US 6,745,921 B2
(45) Date of Patent: Jun. 8, 2004

(54) HAND ACTUATED TOOL AND CLUTCH MECHANISM

(75) Inventor: Clifford Edward Beckett, Thatcham (GB)

(73) Assignee: P.C. Cox Limited, England (GB)

( * ) Notice: Subject to any disclaimer, the term of this patent is extended or adjusted under 35 U.S.C. 154(b) by 51 days.

(21) Appl. No.: 10/078,704

(22) Filed: Feb. 19, 2002

(65) Prior Publication Data

US 2002/0117016 A1 Aug. 29, 2002

(30) Foreign Application Priority Data

Feb. 20, 2001 (GB) ............................................. 0104172

(51) Int. Cl.[7] .............................................. G01F 11/00
(52) U.S. Cl. ........................ 222/391; 222/327; 74/141.5
(58) Field of Search ................................ 222/325, 326, 222/327, 333, 386, 391; 74/156, 141.5

(56) References Cited

U.S. PATENT DOCUMENTS

| | | | | | |
|---|---|---|---|---|---|
| 410,074 | A | * | 8/1889 | Crecelius .................... | 74/141.5 |
| 1,754,132 | A | * | 4/1930 | Bekkum ....................... | 254/384 |
| 1,921,912 | A | * | 8/1933 | De Philipps ................ | 222/391 |
| 2,228,244 | A | * | 1/1941 | Baker ........................... | 166/243 |
| 2,507,254 | A | * | 5/1950 | Jones ........................... | 425/288 |
| 2,523,568 | A | * | 9/1950 | Halverson .................... | 401/65 |
| 2,597,691 | A | * | 5/1952 | Einar ............................ | 74/141.5 |
| 3,353,716 | A | * | 11/1967 | Fuchs Jr. .................... | 222/132 |
| 3,799,406 | A | * | 3/1974 | St. John et al. ............ | 222/309 |
| 3,833,091 | A | * | 9/1974 | MacPherson ................ | 187/206 |
| 4,471,888 | A | * | 9/1984 | Herb et al. .................. | 222/137 |
| 4,566,610 | A | * | 1/1986 | Herb ............................ | 222/137 |
| 4,655,372 | A | * | 4/1987 | Ross et al. ................... | 222/391 |
| 5,511,699 | A | | 4/1996 | Tepic .......................... | 222/326 |
| 5,755,362 | A | * | 5/1998 | Rodriguez et al. ......... | 222/391 |
| 5,909,830 | A | * | 6/1999 | Bates et al. ................. | 222/327 |

FOREIGN PATENT DOCUMENTS

| EP | 0 645 194 B1 | 9/1994 | ........... B05C/17/01 |
|---|---|---|---|
| EP | 0 645 194 | 3/1995 | |
| GB | 2 178 689 | 2/1987 | |

* cited by examiner

*Primary Examiner*—Gene Mancene
*Assistant Examiner*—Patrick Buechner
(74) *Attorney, Agent, or Firm*—Olson & Hierl, Ltd.

(57) ABSTRACT

A clutch mechanism for a hand tool comprises a body with a converging internal wall surface which is mounted on a rod. The body houses a set of ball bearings which are biased along the converging wall into an engaged position with a rod passing through the body. An axial force applied to one end of the body causes the balls to grip the rod. Whereas a force applied to the other end of the body releases the balls from the rod.

25 Claims, 11 Drawing Sheets

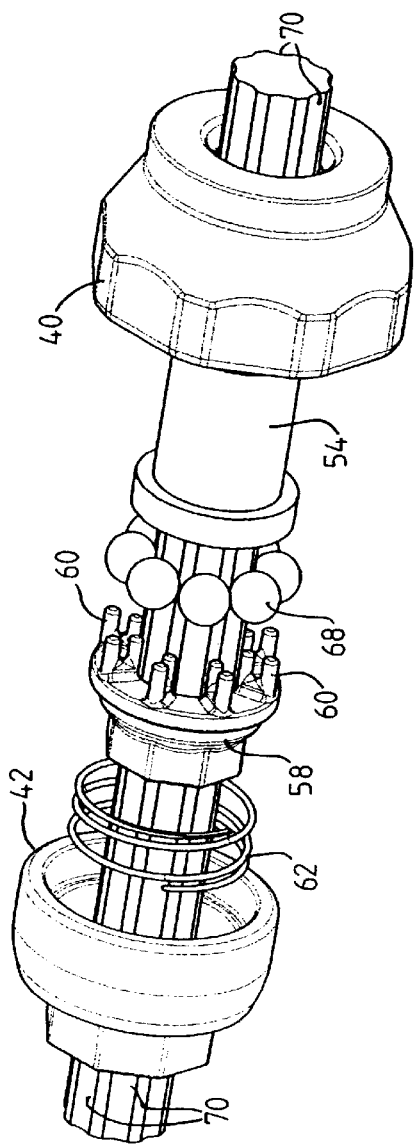
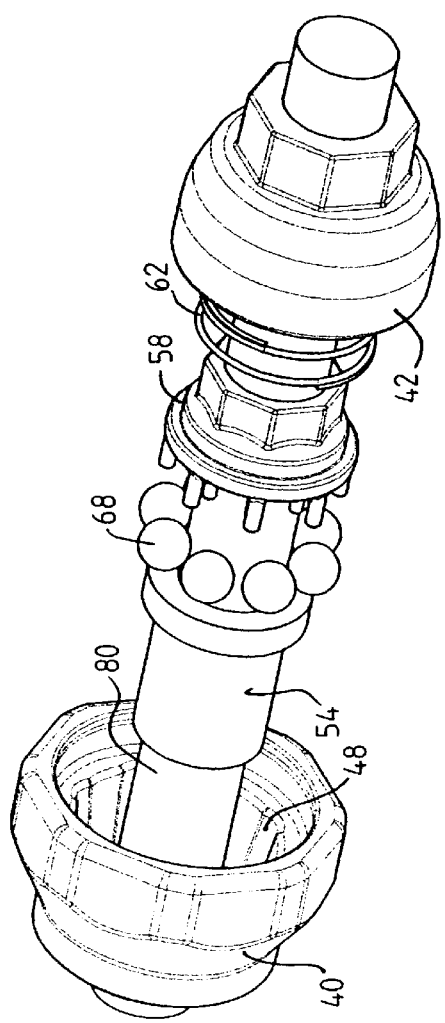

HAND ACTUATED TOOL AND CLUTCH MECHANISM

The present invention relates to clutch mechanisms for engaging a rod for longitudinal movement. The invention is particularly, though not exclusively, applicable to actuators for hand-held devices, such as applicators for dispensing viscous material.

Applicators for fluids, such as sealants, mastic and other compounds of a thick or pasty nature, are well known. Their basic design has not changed over many decades. Typically, they comprise a frame supporting a yoke in which a cartridge of the compound is positioned. The compound is dispensed from a nozzle as a plunger on a rod advances into the cartridge. An actuating mechanism is also mounted on the frame. This comprises an apertured drive plate mounted on the rod which is engaged by a trigger. As the trigger is squeezed, it tilts the plate to engage the rod and, thereafter, move the rod forwardly. In this sense the inventors have come to view the plate as a form of clutch, harnessing the trigger movement and imparting it to the rod. An apertured brake plate is mounted on the rod behind the drive plate. This is biased into engagement with the rod to allow the rod to advance but prevent it from retreating until it is released manually.

The prior art mechanisms are around 50% efficient based on the ratio of effort applied to the trigger in relation to the resultant force at the plunger. A major contributory factor to this level of inefficiency is the binding of the rod in the bores in the frame by which the rod is supported. The friction problem is caused by the bending moment imposed on the rod by the trigger acting on the drive plate. As the force on the drive plate is applied to one side of the rod, the force transmitted to the rod is out of balance. In heavy duty applications this bending moment is a significant contributory factor to the overall diminution of efficiency.

It has been proposed in EP-A-0645194 to address this by balancing the forces applied by using two drive plates one on either side of the rod, that are engaged by the trigger coincidentally. This has some beneficial effect, but the catch plates are arranged one behind the other, producing some bending moments between them. The proposed system still requires off-centre plates extending in opposite directions. Also, there are still only two points of contact for each plate on the rod.

It is an object of the present invention to provide a balanced clutch mechanism for a rod.

According to the present invention there is provided an clutch mechanism for a rod comprising a body having first and second ends and an aperture partially defined by a wall having a converging portion, through which aperture the rod extends between first and second ends of the body, rod engaging means within the body moveable relative thereto between an engaged position towards the first end of the body, in which the bearing means are engaged between the wall and the rod such that the rod is fixed relative to the body when a force is applied to the first end of the body, and a disengaged position towards the second end of the body, in which the rod is movable relative to the body.

The present invention provides an clutch mechanism that embraces the rod in which the means for engaging the rod are retained within the body. The force on the rod is applied through the body which can be engaged as necessary.

Preferably, the rod engaging means are spaced around the rod to distribute the load evenly.

The engaging means may be adapted for rolling contact e.g. balls, preferably ball bearings, or rollers, or slidable members such as wedges.

Preferably, the converging wall defines the guide surfaces so that the engaging means are entrained to movement axial to the rod. The engaging means may additionally have a spacer means, for example a cage, for maintaining them in their respective positions.

To allow the mechanism to operate in any orientation the engaging means are preferably biased to the engaged position. The mechanism may then also be provided with a release mechanism by which the engaging means are urged from the engaged position.

The invention also extends to a hand tool incorporating a clutch mechanism as defined. More particularly, the invention extends to a dispensing mechanism incorporating a clutch mechanism as defined. The use of the mechanism in a hand tool is particularly advantageous as it addresses the particular problem of the off-axis driving force and is, therefore, of particular benefit.

The clutch mechanism can also be used as a braking clutch as well as a means of engaging a rod to drive it.

The present invention can be put into practice in various ways, some embodiments of which will now be described by way of example with reference to the accompanying drawings in which.

Figure 1:
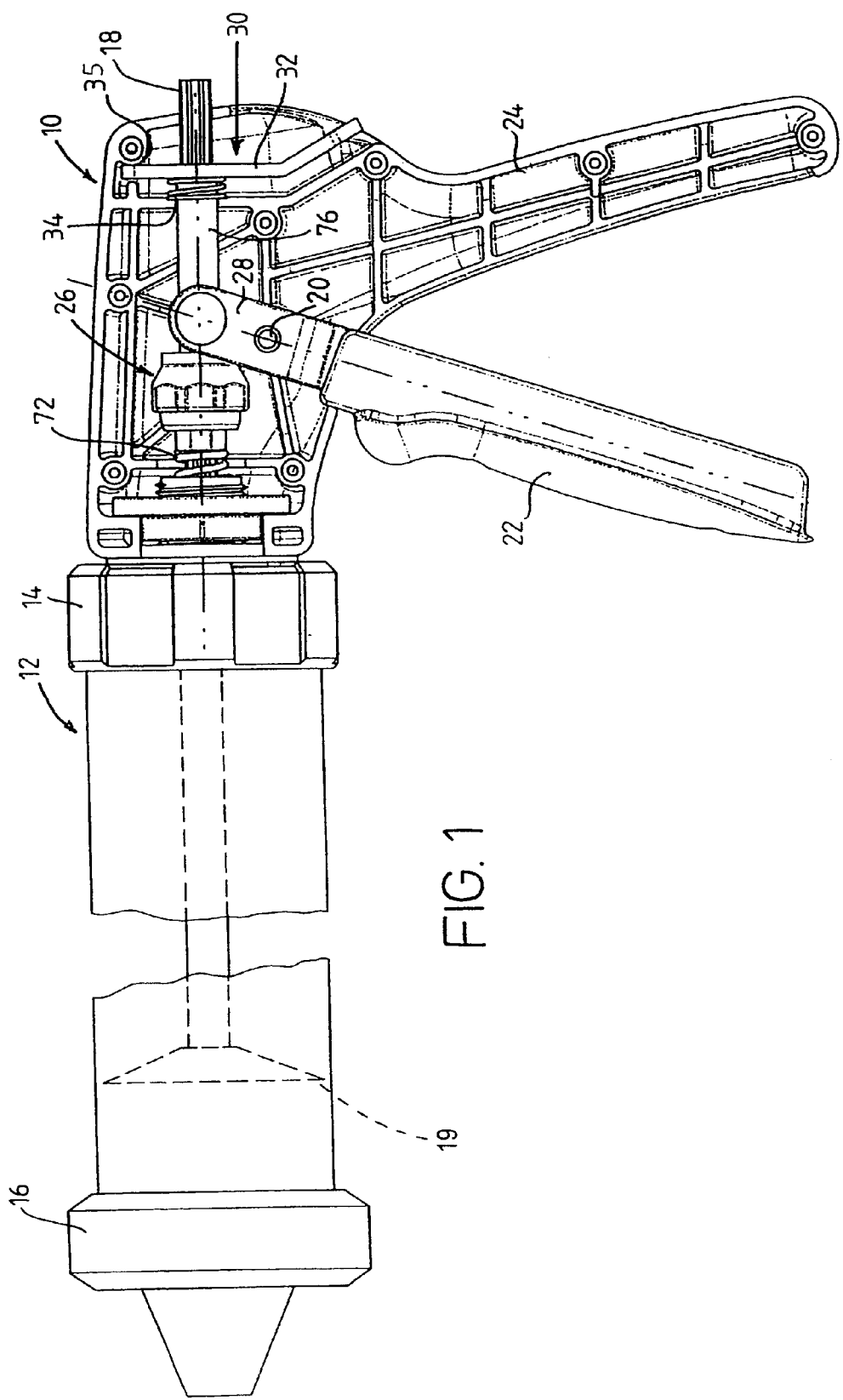
FIG. 1 is a partially sectioned side view of a dispenser incorporating the present invention.
Figure 4A:
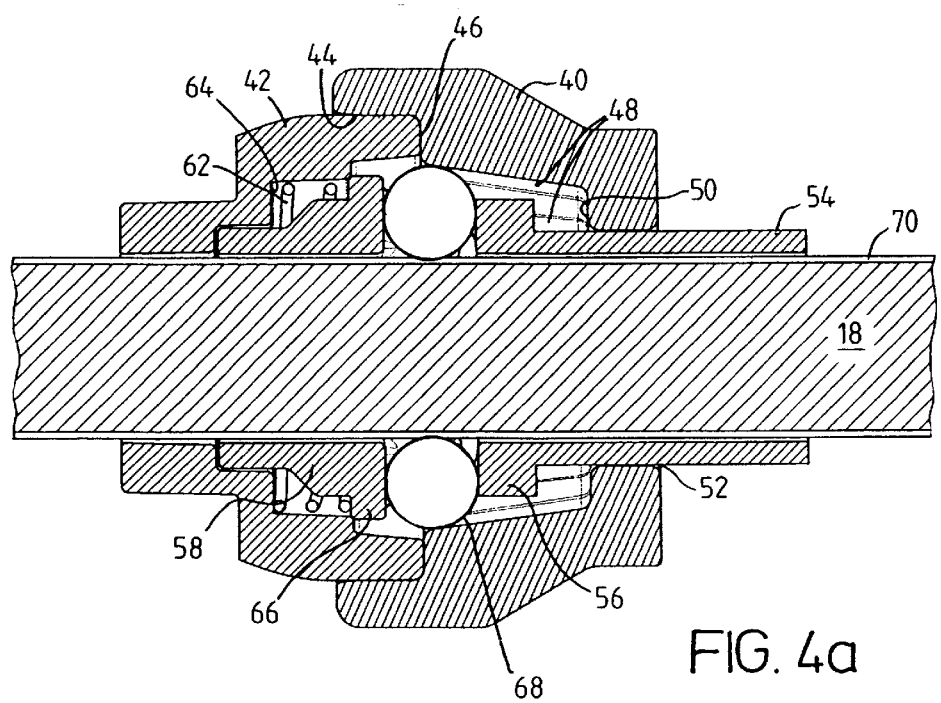
Figure 7:
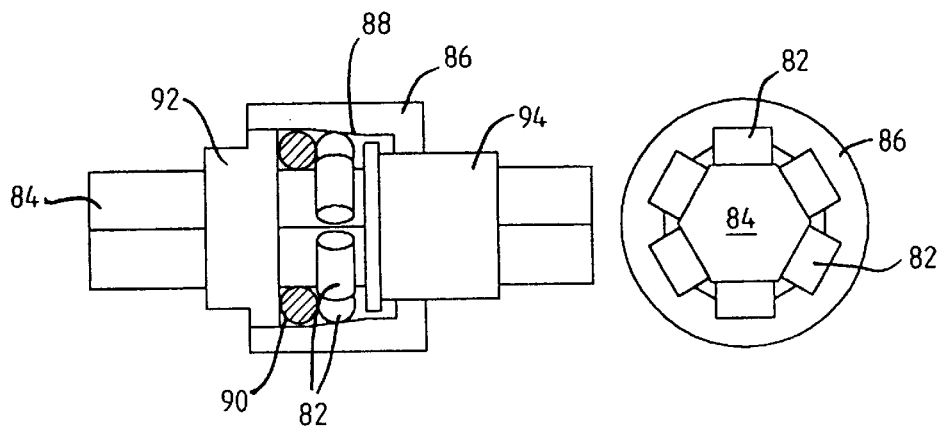
Figure 8:
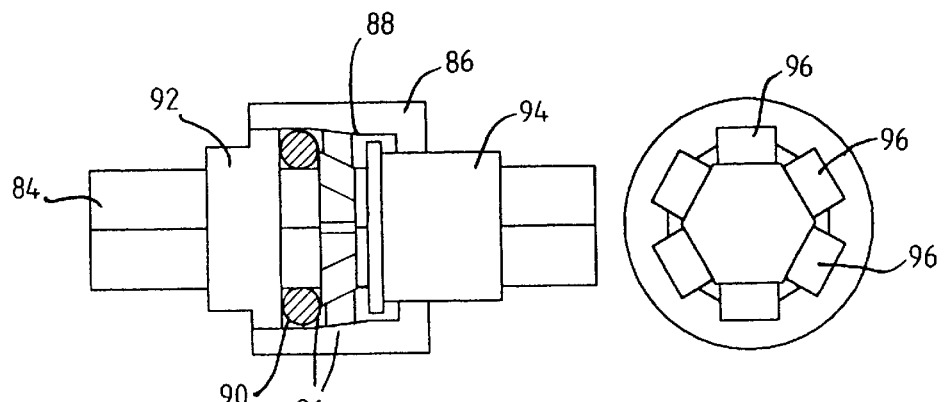
Figure 9:
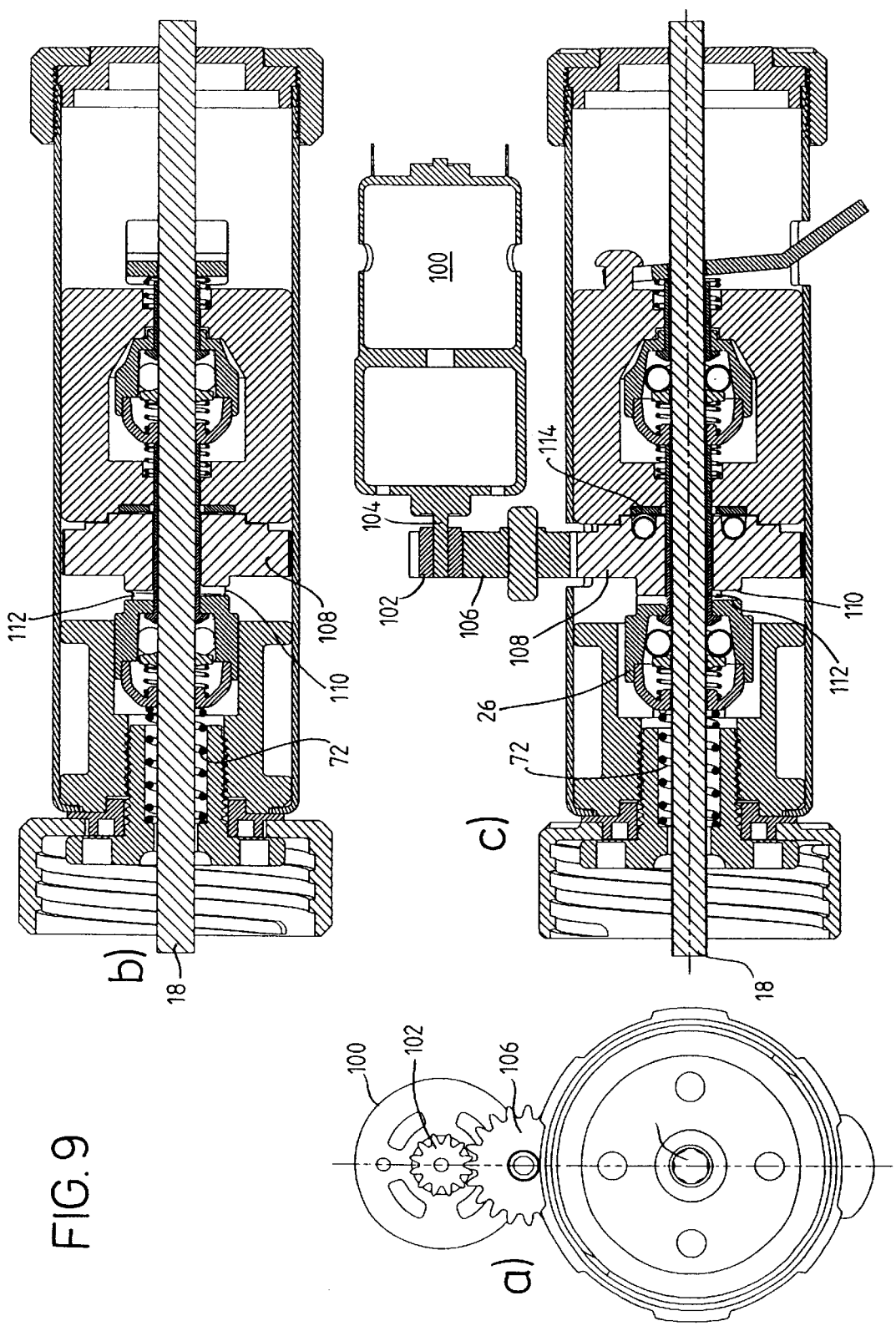
Figure 10:
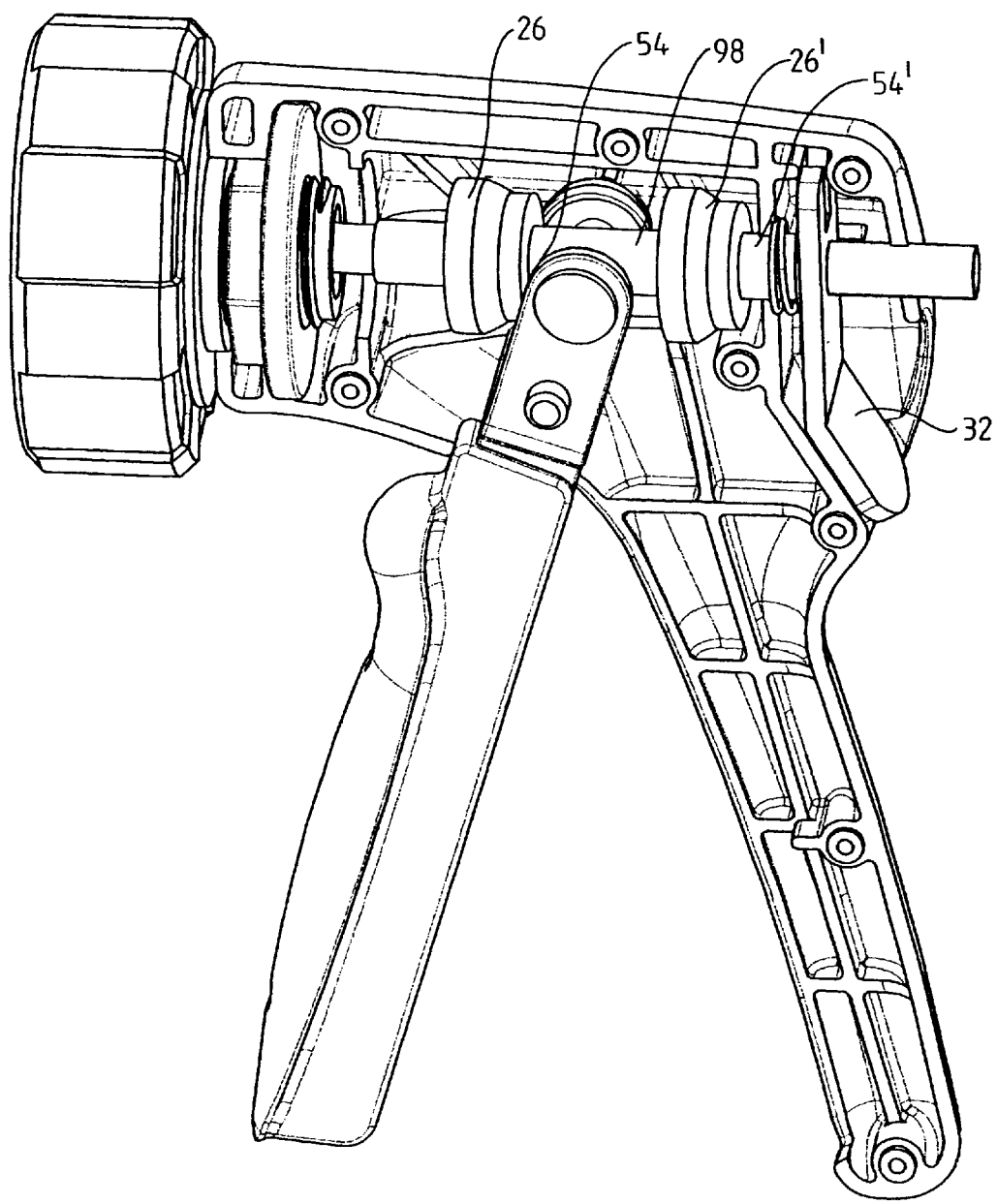
Figure 11:
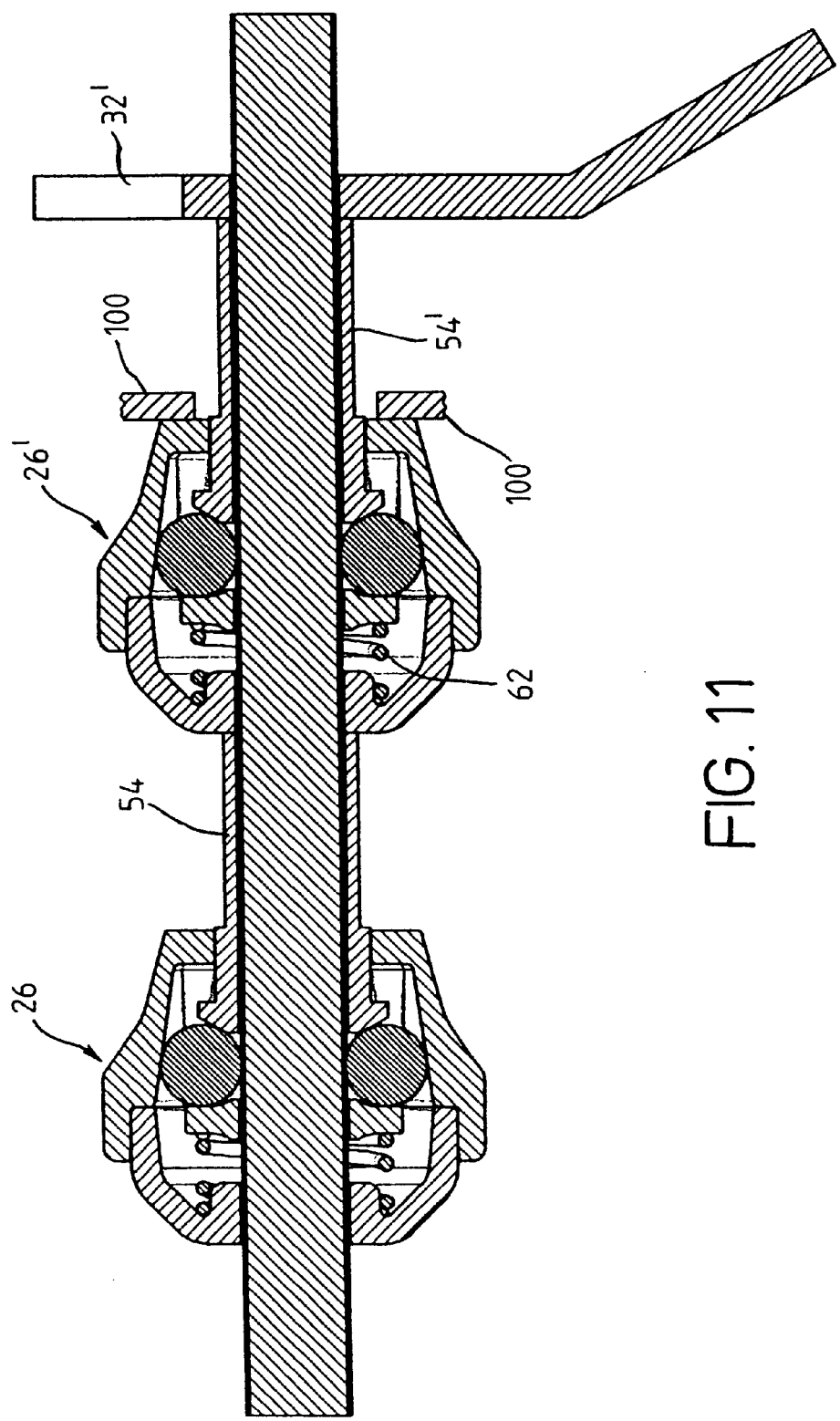

FIGS. 4a and b are lateral cross sections of the mechanism of the dispenser of FIG. 1 in different positions;

FIG. 5 is an exploded view of the components of the mechanism of FIG. 4;

FIG. 6 is an exploded view of an alternative form of the mechanism of FIG. 5;

FIG. 7 is a cross section of an alternative form of the present invention;

FIG. 8 is a schematic view of a mechanism according to a further embodiment of the invention;

FIGS. 9a through c are illustrations of a motorised form of the invention;

FIG. 10 is a cutaway perspective view of a further form of the invention;

FIG. 11 is a section through the mechanisms of FIG. 10; and

Figure 12:
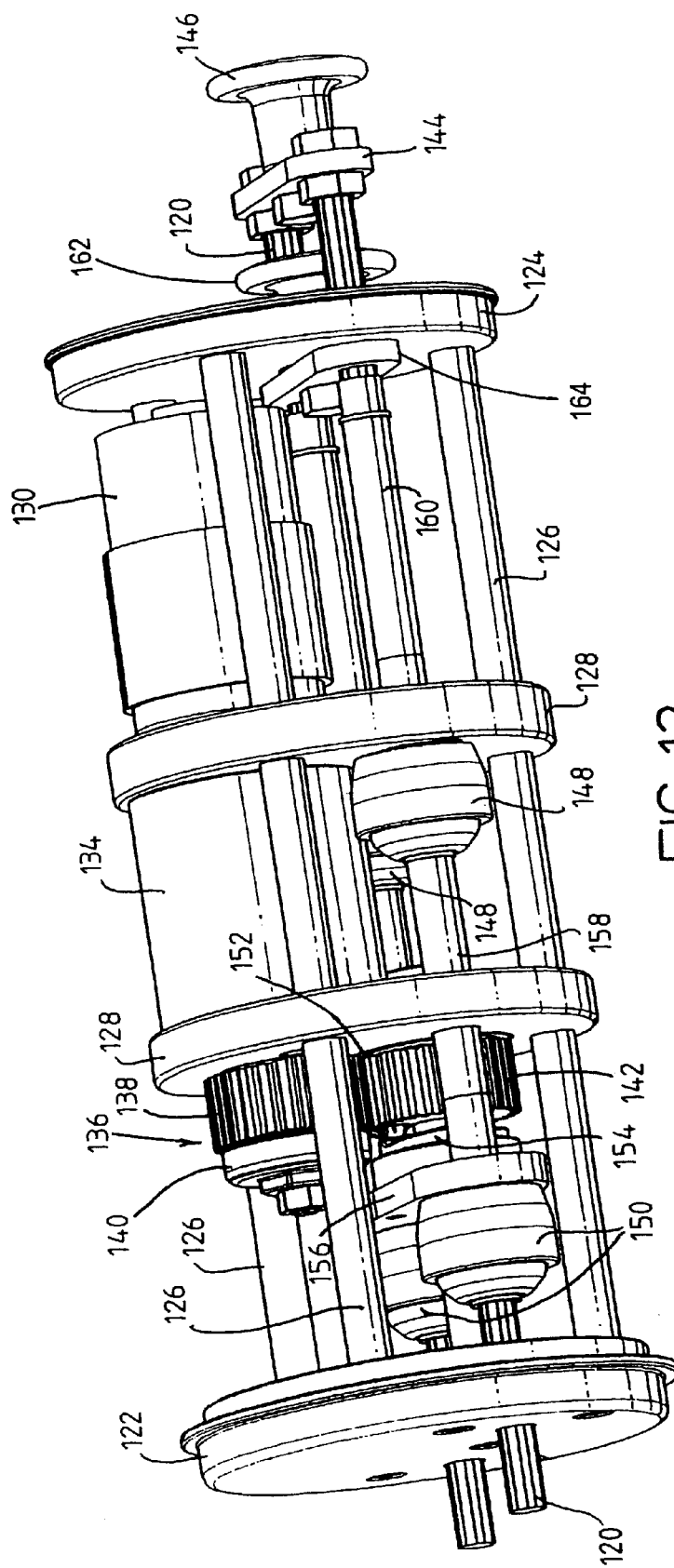

FIG. 12 is a cutaway perspective view of any embodiment of the invention; and

Figure 13:
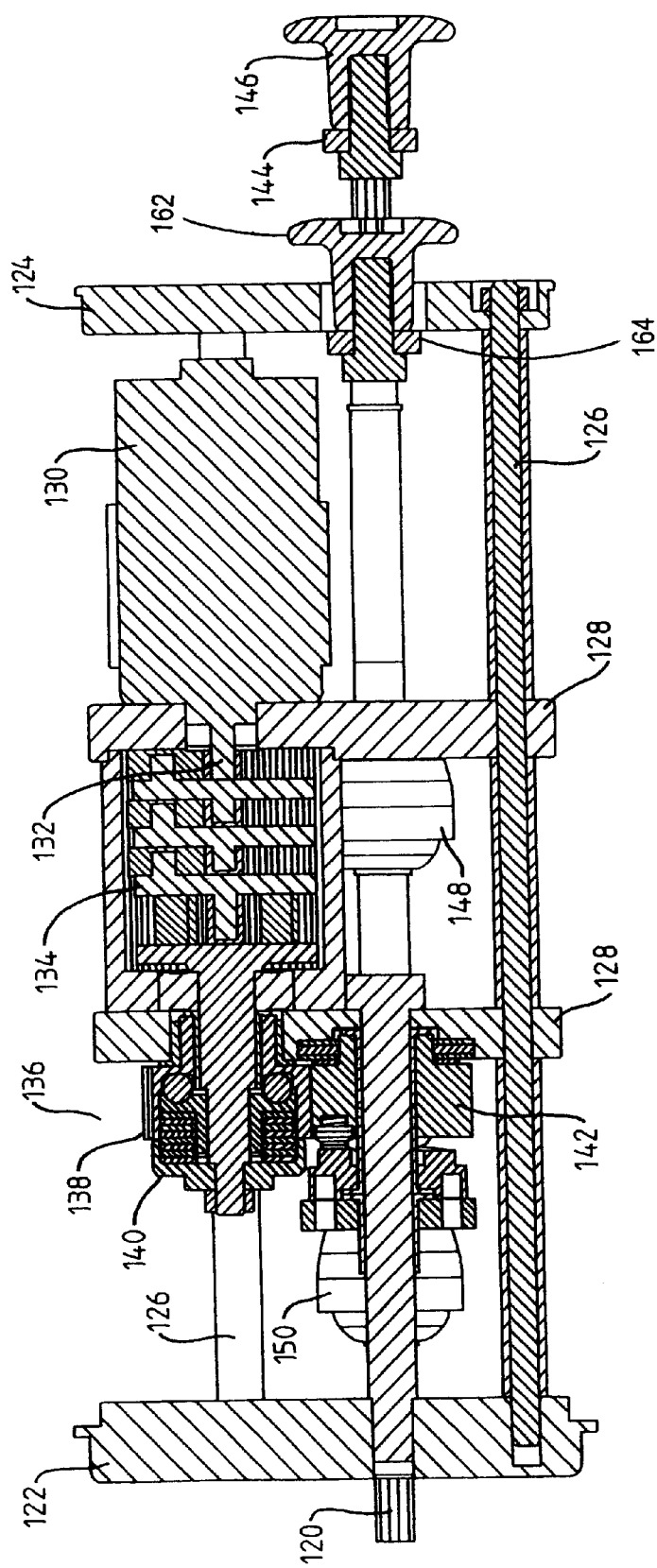

FIG. 13 is a cross-section of the mechanism of FIG. 12.

Figure 2:
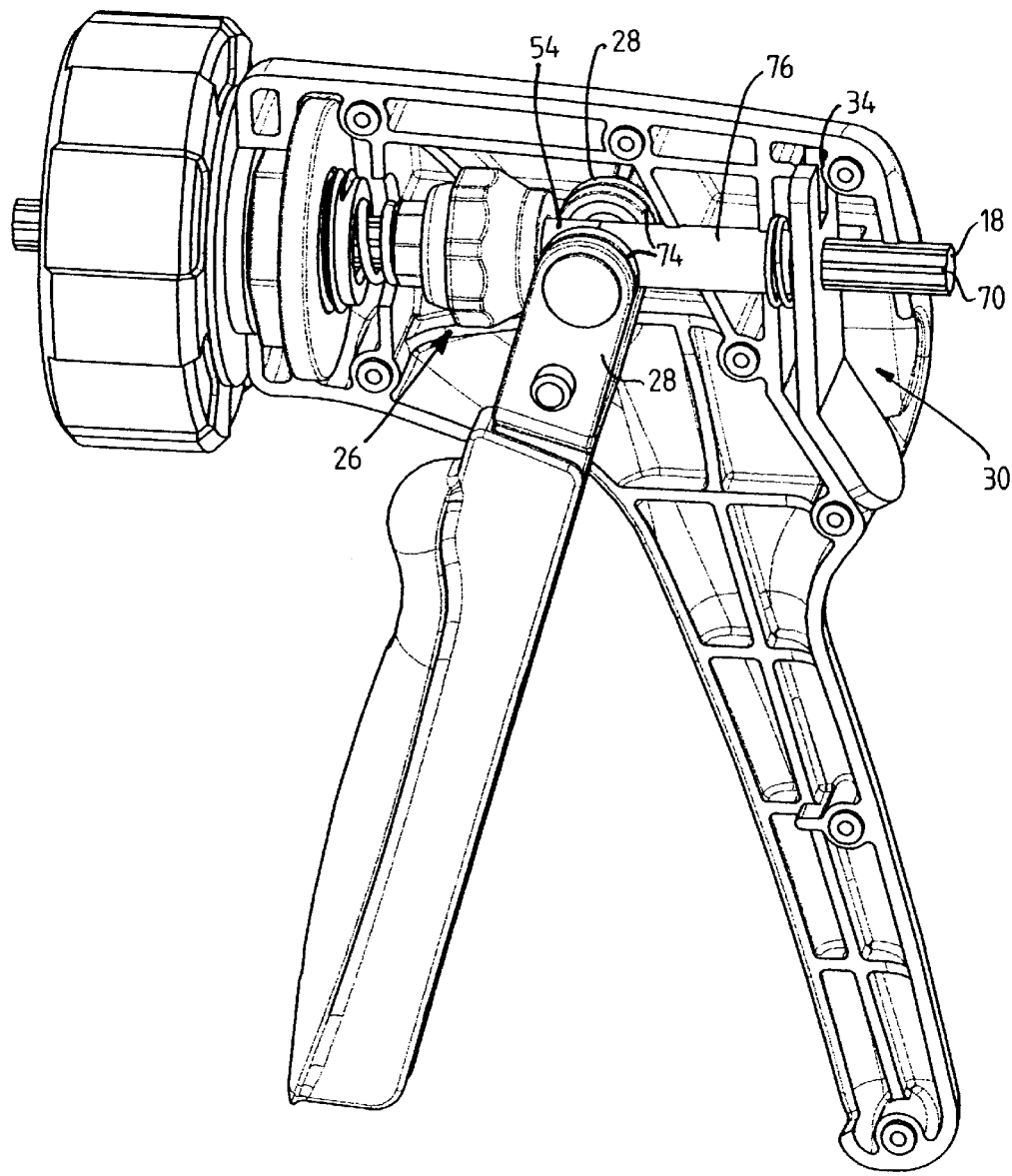
FIG. 2 is a cutaway perspective view of the dispenser of FIG. 1.
Figure 3:
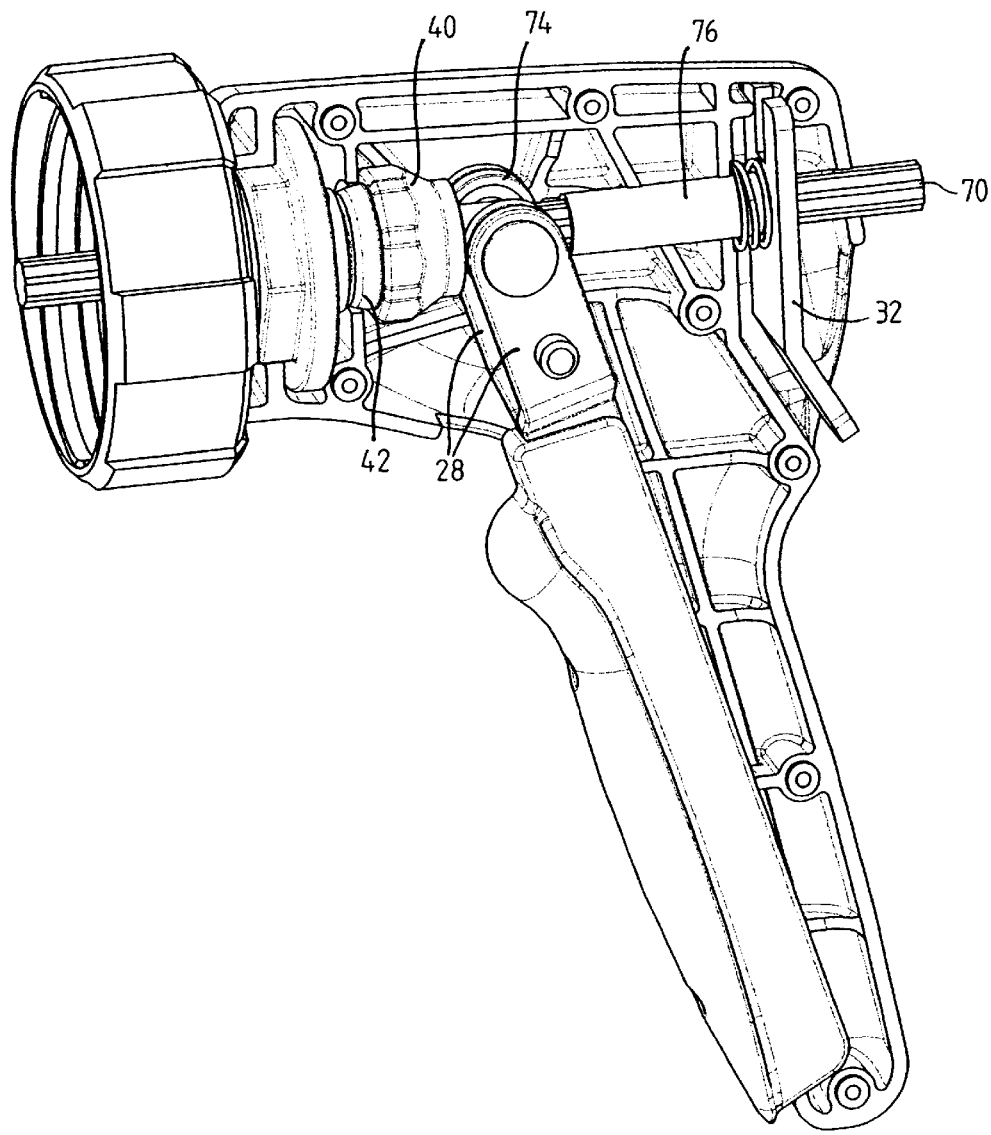
FIG. 3 is an alternative cutaway perspective view of the dispenser of FIG. 1.

Referring to FIGS. 1, 2 and 3 of the drawings, an applicator comprises a cast-aluminum frame 10 on which is mounted a cartridge yoke 12 by means of a threaded collar 14. The frame is made in two halves, one of which is removed in the drawings for the purposes of illustration. The frame can be pressed or moulded of a suitable material. The cartridge (not shown) of material to be dispensed is held captive in the yoke 12 by a threaded apertured end cap 16. The end cap 16 has a nozzle through which the material in the cartridge is dispensed.

A hardened high carbon (EN8 or EN9) steel rod 18 extends through apertures in the frame 10 into the yoke 12. The rod has to be sufficiently hardwearing and any suitable (e.g.) metal on plastics material could be contemplated. The end of the rod 18 inside the yoke 12 carries a plunger 19. A trigger 22 is pivotably mounted about a point 20 in the frame 10. A butt 24 is formed in the frame adjacent the trigger 22 so that it is operable as a lever by being squeezed against the butt using manual force. The trigger is made of cast aluminium or another suitable metal. However, it could be made of a plastics material for lightness in some applications.

A rod advancing mechanism 26 is mounted on the rod 18. It is basically a uni-directional clutch. It is arranged to be moved forward by a pair of tines 28, forming part of the trigger 22 and extending from the opposite side of the pivot point 20 from the trigger lever to either side of the rod 18. The tines 28 engage an end face of the advancing mechanism 26 at opposed points on either side of the rod to propel it forwards as described below.

A conventional brake mechanism 30 is mounted on the rod 18 to prevent the rod from retreating until the brake mechanism is disengaged. As is conventional, in this embodiment the brake mechanism 30 comprises an apertured metal plate 32 which abuts a projection 35 on the inside of the frame 10 on one side of the rod 18. The plate 32 is biased into the braking position, in which it is tilted to engage the rod, by a spring 34 braced against a web in the frame. Thus, as the rod is urged to retreat, the brake plate 32 abuts the projection and bites on the rod. As the tilted brake plate 32 is captive in the frame, its engagement with the rod prevents the latter from retreating.

To dispense material from the cartridge, the trigger 22 is squeezed to rotate it towards the butt 24. Consequent rotation of the tines 28 in the opposite direction advances the advancing mechanism 26. As the mechanism is engaged with the rod by virtue of the force applied by the tines 28, the rod is thereby advanced as well. Repeated squeezing of the trigger will advance the rod each time, the rod being held from retreating by the brake plate as the trigger is released to the operational position at which it rests ready for action.

Figure 4B:
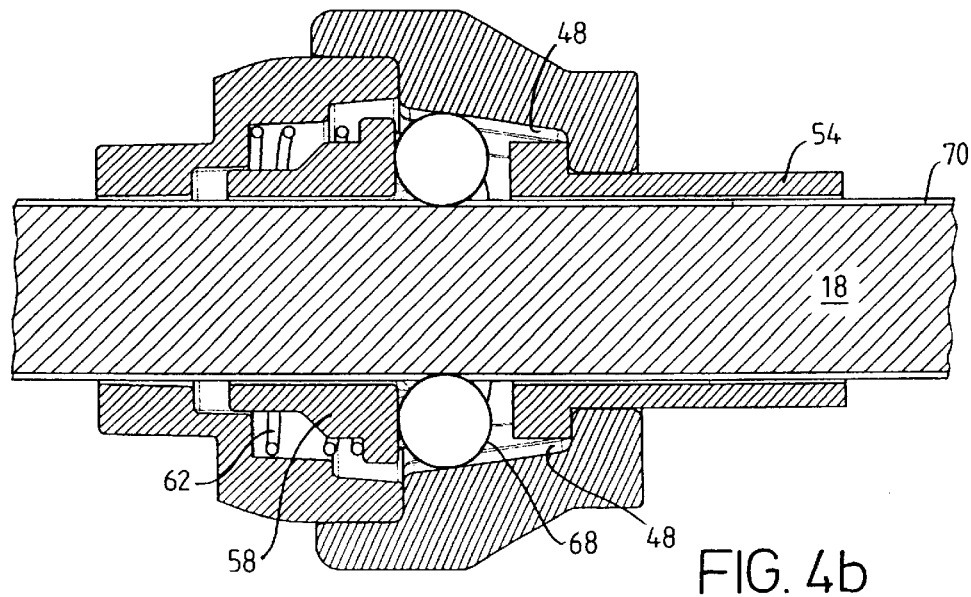

The advancing mechanism 26 is shown in more detail in FIGS. 4a, 4b and 5. It comprises a main body 40 of (e.g.) forged, investment cast or sintered (EN8 or EN9) carbon steel and a retaining cap 42 which is fitted in the internal circular wall 44 of one end of the main body.

The body 40 bears the loads applied to the mechanism and must be made of a suitably durable material considering its role. Consideration needs to be given to this in the choice of body material.

The cap 42 mates against an inwardly projecting annular shoulder 46 in the body 40. From the radially inner edge of the shoulder 46, the inner surface of the main body defines a radially inwardly tapered surface made up of evenly angularly spaced arcuate section channels 48 running in the direction of the taper to a second inner shoulder 50 which defines a circular opening 52 in the other end of the main body. A release sleeve 54 projects through the opening 52. Inside the main body 40 the sleeve has an annular flange 56.

A bias sleeve 58 is arranged within the cap 42 which can be formed with ball spacing pegs 60. The bias sleeve/profiled washer 58 is urged toward the main body 40 by a helical spring 62 which acts between an inner annular surface 64 in the cap 42 and an outer flange 66 on the bias sleeve. A number of ball bearings 68 are arranged in a circular pattern between the pegs 60 on the bias sleeve 58. The balls sit between the release sleeve 54 and the bias sleeve 58 to be moved by them relative to the body 40 as will be described below.

The drive rod 18 extends through the sleeves 54 and 58, the body 40 and the cap 42. The release sleeve 54, the bias sleeve 58 and the ball bearings 68 are moveable axially with respect to the rod 18 within the cavity defined by the body 40. The rod is engageable by the mechanism by movement of the ball bearings along the tapered channels 48. Each of a series axially extending guide grooves 70 on the rod 18 is angularly coincident with a respective channel 48 in the converging inner wall of the main body 40. A force applied to the main body 40, moving it relative to the rod 18 causes each ball bearing 68 to be urged axially along its tapered channel. In effect, the axial movement of the balls 68 is that which is sufficient only for them to bite on the rod according to the taper, the bias sleeve 58 urging the balls 68 into an initial position of contact with the channels 48 and the grooves 70 in the rod. Thus, as shown in FIG. 4b, force on the remote end of the main body 40 wedges the balls between the channels and the grooves in the rod so that the mechanism is engaged to move with the rod. On the other hand, as shown in FIG. 4a, a force applied to the remote end of the cap 42 moves the balls 68 toward the wider part of the taper against the force of the spring 62 on the bias sleeve 58.

The channels 48 are equally arranged around the body 40 with an included convergence angle of between 10° and 20°, preferably between 14° and 18° and particularly 16°. The included angle of the convergent channels ensures that the balls can wedge and release reliably and can be any suitable angle that performs this task.

Due to the frictional engagement that will be created when the balls are wedged between the body and the rod, the release sleeve 54 which is axially moveable is arranged to dislodge the balls from the engaged position. An intermediate sleeve 76 is arranged on the rod between the release sleeve 54 and the brake plate 32 so that a force of the brake plate 32 bears on the release sleeve 54 to release the balls 68 at the time as the brake plate releases the rod 18. Movement of the brake plate, transmitted to the release sleeve by the intermediate sleeve 76 keeps the balls in the disengaged position toward the wider part of the tapered inner surface of the body.

By this action the rod is free to move through the advancing mechanism and the brake plate so that it can be retreated or advanced as necessary.

FIGS. 1 and 2 show the dispenser in its operative position in which a return spring 72 on the rod is urging the trigger 22 away from the butt. It will be seen that each tine 28 carries a rotatable wheel 74 which bears on the remote end of the body 40. Thus, the advancing mechanism 26 is retracted under the influence of the return spring. Squeezing the trigger advances the tines 28 and so advances the advancing mechanism which immediately engages with the rod by virtue of the balls being biased into the engaged position in the tapered surface by the bias sleeve 58. In this engaged configuration of the advancing mechanism the rod is also advanced by rotation of the tines.

At the end of a stroke on the trigger, as shown in FIG. 3, the mechanism 26 is in a fully advanced position against the force of the return spring 72, having moved the rod forward. Releasing the trigger returns the mechanism to the retreated operational position for the next stroke. As the mechanism is urged backwardly, the balls become released from the rod by riding along the taper so that the mechanism is free to move with respect to the rod. The rod itself is braked by the brake plate 32 engaging the rod so only the advancing mechanism is retreated unless the brake plate is depressed. By repeated squeezing of the trigger, the rod is moved incrementally to force the material held in the cartridge in front of the plunger 19 from the nozzle.

The extent of contact of the balls 68 on the rod 18 depends on the depth of the arcuate grooves 70 and the size of the balls themselves. In this embodiment, the balls are 4 mm diameter ball bearings. The grooves have a corresponding arc providing contact with a span of 25° of each ball. As there are eight balls in the set, the total extent of contact with the rod is a span equivalent to about 200° of the circumference of the bar. By evenly spreading the load in this way, the wear caused by contact between the balls on the rod is less severe. The contact is also evenly distributed around the circumference of the rod providing a significantly more balanced grip on the rod. Thus, the opportunity can be taken to relax on the durability of the components to some extent and where the application does not require particularly hard-wearing components. While the preferred embodiments are described herein in terms of hard wearing steels where necessary to suit demanding applications, it is also possible to make the components of the advancing mechanism and/or the rod from less hard metals or suitably rigid plastics. In another form of the invention the balls are 6 mm in diameter, and are arranged as a group of six about a 8 mm diameter rod, giving a contact span equivalent of 198° of the rod in contact with the balls and 45° of each ball circumference.

FIG. 6 illustrates an alternative embodiment of the invention in which like parts have been given the same reference numerals. The rod 80 is circular in section. While this results in less contact area between the balls and the rod, which will be more wearing on the rod assuming typically hard ball bearings, this embodiment of the invention has the benefit of the using a less expensive form of rod. Circular section rod is cheaper in any event. However, it is also more susceptible to evenly distributed induction hardening than the fluted rod 18.

The purpose of the ball bearings 68 in the above embodiments is to create the frictional engagement between the rod and the body rolling between positions.

FIG. 7 illustrates an alternative embodiment in which the balls are replaced by six rollers 82, each of which acts on a respective flat of a hexagonal drive rod 84. It will be appreciated that the convergent internal surface of the body 86 is formed as a similarly tapered housing for the rollers, defining a hexagon of flat surfaces 88. An O-ring 90 is arranged between the rollers 82 and a closing cap 92. The O-ring 90 takes the place of the helical spring 62 in the previously described embodiments. The advancing mechanism of the embodiment also includes a release sleeve 94 projecting from the end of the body opposite the closing cap 92. In this embodiment, the contact between the rollers and the rod is effected through flat surfaces. As a result, the contact between the rollers and the rod can extend almost up to 360° depending on the length of each roller as a proportion of its respective flat of the hexagonal rod 84.

A further embodiment of the present invention is illustrated in FIG. 8 in which the rolling form of the balls and the rollers described above is replaced by six wedge-shaped members 96 arranged to slide over the flats of a hexagonal bar. Six ball bearing running in arcuate channels in the body of the mechanism could also be used with the hexagonal bar or a bar having six angularly spaced axially extending arcuate-section grooves. Thus, the invention extends to the use of one or more members which create the frictional engagement between the rod and the body riding on it. As a mechanism, the invention is applicable to various devices in addition to dispensers. Hand tools requiring adjustment by means of a mechanism that advances a rod and automatically locks the rod in place are also susceptible to the benefits of this invention. An example of such a tool is the single-handed G-Clamp illustrated in GB-A-2178689 incorporated herein by reference. This uses essentially the same mechanism as the prior art dispenser.

While the invention has been desribed above in relation to a manually operated hand tool, FIGS. 9a through c and 10 illustrate an embodiment in which the advancing mechanism is driven by an electric motor 100. A drive gear wheel 102, mounted on the shaft 104 of the motor, engages an intermediate gear wheel 106 which drives a main gear wheel 108. The main gear wheel is connected with a coaxially rotatable annular ramp 110 which bears against a complementary rotationally fixed surface 112 on the outside of the end of the main body 40 of the mechanism 26. The gearwheel has a central hole through which the drive rod 18 of the dispenser passes. In this embodiment the trigger for advancing the rod mechanically is replaced with a finger button (not shown) for actuating an electrical switch which controls the motor 100. The annular ramp surface 110 rotates against the surface 112. Resting against a thrust bearing 114 as the ramp surface 110 rotates, it pushes the mechanism forward until steps at the end of the ramps coincide, when the mechanism is retreated under the force of the return spring 72. Thus, the rod is advanced with the mechanism 26 as the ramp surface 110 rotates, but it is braked by a brake mechanism at the end of the cycle of rotation. The brake mechanism is described in further detail below. Continued running of the motor will advance the rod in increments. The ramp surfaces may define multiple steps instead on one per rotation.

As the motor drives the gearwheel, the engaged surfaces ride over one another so, that the drive mechanism is advanced until the steps coincide when it retreats. In either case, continued rotation of the gear wheel imposes a reciprocating motion on the drive mechanism, so driving the rod forwardly in the process. The cam profile will dictate the amount of movement which the drive mechanism undergoes. It will be appreciated by the person of ordinary skill in the art that there is a trade-off between torque and speed for an electric motor of a given power output. The characteristics of the motor will influence the steepness and number of ramp surfaces. A small amount of movement per cam cycle can be compensated for by increasing the speed of the motor. By using a small amount of forward motion for each cam cycle and a motor of sufficient speed, a motorised dispenser can be arranged to achieve the perception of a constant dispensing force.

FIGS. 10 and 11 illustrate a further embodiment manually actuated form of the invention in which the clutch-type mechanism of the invention is used as a means for advancing the rod and also the means for braking it in place of the brake. The brake comprises a second mechanism 26' on the rod behind the tines 28.

The plate 32' does not engage the rod itself but is used to transmit a force from the user's thumb to release the engaging balls, rollers or wedges in the second mechanism 26' through a second release sleeve 54'. In turn, the force applied to the second mechanism 26' is applied to the release sleeve 54 of the first mechanism 26 through an intermediate sleeve 98. The dispenser operates according to the same principle. The trigger engages the first mechanism to advance the rod. The rod is prevented from retreating by the second mechanism 26' bearing against an internal wall 100 of the frame in front of the plate 32. The second mechanism 26' is automatically biased into engaging the rod by its bias spring 62. The rod can only be retreated by the force applied to the plate 32 which pushes the engaging balls, rollers or wedges forwards out of engagement.

FIGS. 12 and 13 show an alternative form of the motorised rod advancing mechanism incorporating the invention. This uses two drive rods 120 for a dual cartridge arrangement in which materials are dispensed simultaneously and mixed in the outlet nozzle. Such 'bi-mixer' devices are well known in the art. The cartridge are matched to be of a size ratio which corresponds to the ratio in which the materials are to be mixed.

A pair of circular plates 122 and 124 are spaced apart by bars 126 to form a frame. A pair of interstitial plates 128 secured to the rods provide mounting brackets for the motorization equipment to be described. The frame is covered in a circular section tubular plastics sleeve (not shown).

An electric motor 130 is mounted on one side of a rear one of the interstitial plates 128. Its output shaft 132 passes through an aperture in the interstitial plate and drives a four-layer sun-and-planet gear system 134 mounted between the interstitial plates 128. The output of the sun-and-planet gear system 134 is directly connected to a drive gear 136 in a forward compartment of the frame. In this embodiment, the motor is a 12 volt dc 10,000 r.p.m. device. The reduction ratio within the sun-and-planet gear system provides an output at 30 r.p.m. The drive gear comprises a drive cog 138 which is mounted on the output of the gear system 134 by a torque limiting device 140. The drive cog 138 meshes with an idler cog 142 providing a one-to-one ratio output for driving the rods 120 as described below. While a particular form of electric motor and gear system is disclosed, it will be apparent to the person skilled in the art that other forms of motor and gear system could be used to equal effect. In certain environments pneumatic or other fluid driven motors could be used. Instead of a gear system, a direct drive could be arranged at the output of the motor.

The rods 120 are arranged in parallel, passing through corresponding apertures in the plates of the frame. At the rear most end they are bolted together through a crossbar 144 to which is also connected a retractor knob 146. A first clutch mechanism 148 according to the invention is mounted on each of the rods 120 between the interstitial plates 128. Further clutch mechanisms 150 according to the invention are mounted on the rods in the forward compartment of the frame in front of the forward interstitial plate. The clutch mechanisms 148 between the interstitial plates are the brake mechanisms, preventing retreat of the rod when it is not required. The forward clutch mechanisms 150 provide the drive to advance the rods 120 under the influence of the electric motor.

Rotation of the idler cog 142 by the electric motor at a rate of 30 r.p.m. drives a roller 152 on the end face of the cog in a circular motion over the corresponding ramps or cam surfaces of member 154 connected to a plate 156 arranged around each of the rods and thereby transmitting axial force applied to the member as the roller 152 travels over it undulations to the drive mechanism 150 engaging each of the rods. The member 154 comprises three rising ramp surfaces which are swept by the roller in one rotation. The rise of each ramp is 1.5 mms, providing a total 4.5 mm advance per revolution of travel by the roller. At a rate of rotation of 30 r.p.m. the rate of advance of the rods is, therefore, 135 mm per minute or 2.25 mm per second. As has been described previously, the clutch mechanisms 148, braced against the rear interstitial plate 128, are provided for braking the rods from retreating in between each travel of the ridge along a ramp on the member.

To release engagement by the brake and drive clutch mechanisms, sleeves 158 and 160 are arranged on each of the rods 120 which transmit a pushing force applied to a central knob 162 connected to a release plate 164 riding on the rods between the rear plate 124 and the sleeve 160. By pressing on the knob 162, the sleeves are urged forwards and the balls in each of the mechanisms are disengaged from the rod to allow free movement of the rods by pulling on the attached retractor knob 146.

It will be appreciated that the cartridges containing the materials to be dispensed by advancement of the rods, using conventional plungers on the rods 120 are attached to the forward end plate of the frame. However, these have been omitted from the drawings for the sake of clarity.

The embodiments of the invention described are susceptible to other modifications and variations in components and materials. The body of the mechanism may not necessarily enclose the rod engaging members, but could be a cage retaining the members in their operative relationships. The above description is provided by way of example and not for the purposes of limitation. The invention is intended to be limited only by the spirit and scope of the following claims.

What is claimed is:

1. A clutch mechanism for a rod comprising a body having an aperture, through which the rod extends, the aperture being partially defined between first and second ends of the body by a wall surface converging toward the rod at the first end, the mechanism further comprising a rod engaging member moveable along a respective wall surface between a first position, in which the engaging member is engaged between the wall surface and the rod such that the body is movably engaged with the rod when a force is applied to the first end of the body, and a disengaged position, in which the rod is moveable relative to the body, the converging wall surface defining a guide having a lateral profile which is complimentary to an adjacent surface of the engaging member.

2. A mechanism as claimed in claim 1 in which the rod engaging member comprises a plurality of members evenly arranged around the rod.

3. A mechanism as claimed in claim 1 including a spacer arranged to hold the rod engaging member in its relative positions.

4. A mechanism as claimed in claim 1 including a release member extending into the body to engage the engaging member from the first end, by which release member a force applied urges the engaging member to the disengaged position.

5. A mechanism as claimed in claim 1 in which the rod is formed with axially extending surfaces having a lateral profile which is complementary to an adjacent surface of the engaging member.

6. A dispenser tool comprising a frame, a first clutch mechanism as claimed in claim 1, the rod being mounted in the frame for axial movement, and a first actuating member for actuating the mechanism to advance the rod by applying a force to the first end of the body.

7. A mechanism as claimed in claim 1 in which the engaging member is adapted for sliding contact with the rod.

8. A mechanism as claimed in claim 7 in which the engaging member is wedge-shaped.

9. A mechanism as claimed in claim 1 including a bias member arranged to urge the engaging member to the engaged position.

10. A mechanism as claimed in claim 9 in which the bias member is a resilient member arranged to bear on the engaging member from the second end of the body.

11. A mechanism as claimed in claim 1 in which the engaging member is adapted for rolling contact with the rod.

12. A mechanism as claimed in claim 11 in which the engaging member is a ball bearing.

13. A mechanism as claimed in claim 11 in which the engaging member is a roller bearing.

14. A hand tool comprising a first clutch mechanism as claimed in claim 1, mounted in a frame and a first actuating member for actuating the mechanism to advance the rod by applying a force to the first end of the body.

15. A tool as claimed in claim 14 in which the first actuating member comprises a lever manually pivotable to bear on the first end of the body to advance the rod.

16. A tool as claimed in claim 14 including a second clutch mechanism arranged on the rod behind the first clutch mechanism, a second actuating member for actuating the second clutch mechanism to urge the rod engaging member of the second clutch mechanism into the disengaged position.

17. A hand tool as claimed in claim 14, including an attached device for dispensing thick liquids to be actuated by said mechanism.

18. A tool as claimed in claim 14 including a motor driving member moveable against the first end of the body to advance the rod.

19. A tool as claimed in claim 18 in which the driving member includes a cam.

20. A clutch mechanism for a rod comprising a body having an aperture, through which the rod extends, the aperture being partially defined between first and second ends of the body by a wall surface converging toward the rod at the first end, the mechanism further comprising a rod engaging member moveable along a respective wall surface between a first position, in which the engaging member is engaged between the wall surface and the rod such that the body is movably engaged with the rod when a force is applied to the first end of the body, and a disengaged position, in which the rod is moveable relative to the body, the engaging member being a roller bearing adapted for rolling contact with the rod.

21. A dispenser tool comprising a frame, a first clutch mechanism as claimed in claim 20, the rod being mounted in the frame for axial movement, and a first actuating member for actuating the mechanism to advance the rod by applying a force to the first end of the body.

22. A clutch mechanism for a rod comprising a body having an aperture, through which the rod extends, the aperture being partially defined between first and second ends of the body by a wall surface converging toward the rod at the first end, the mechanism further comprising a rod engaging member moveable along a respective wall surface between a first position, in which the engaging member is engaged between the wall surface and the rod such that the body is movably engaged with the rod when a force is applied to the first end of the body, and a disengaged position, in which the rod is moveable relative to the body, the engaging member being wedge-shaped and adapted for sliding contact with the rod.

23. A dispenser tool comprising a frame, a first clutch mechanism as claimed in claim 22, the rod being mounted in the frame for axial movement, and a first actuating member for actuating the mechanism to advance the rod by applying a force to the first end of the body.

24. A clutch mechanism for a rod comprising a body having an aperture, through which the rod extends, the aperture being partially defined between first and second ends of the body by a wall surface converging toward the rod at the first end, the mechanism further comprising a rod engaging member moveable along a respective wall surface between a first position, in which the engaging member is engaged between the wall surface and the rod such that the body is movably engaged with the rod when a force is applied to the first end of the body, and a disengaged position, in which the rod is moveable relative to the body, the rod formed with axially extending surfaces having a lateral profile which is complimentary to an adjacent surface of the engaging member.

25. A dispenser tool comprising a frame, a first clutch mechanism as claimed in claim 24, the rod being mounted in the frame for axial movement, and a first actuating member for actuating the mechanism to advance the rod by applying a force to the first end of the body.

* * * * *